United States Patent
Fu et al.

(10) Patent No.: US 12,294,286 B2
(45) Date of Patent: May 6, 2025

(54) POWER CONVERSION DEVICE AND VOLTAGE CONTROL METHOD

(71) Applicant: Delta Electronics (Shanghai) Co., Ltd., Shanghai (CN)

(72) Inventors: Xiaoping Fu, Shanghai (CN); Xinghua Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 208 days.

(21) Appl. No.: 17/822,141

(22) Filed: Aug. 25, 2022

(65) Prior Publication Data

US 2023/0179078 A1 Jun. 8, 2023

(30) Foreign Application Priority Data

Dec. 6, 2021 (CN) .......................... 202111481016.5

(51) Int. Cl.
*H02M 1/00* (2007.01)
*H02M 1/42* (2007.01)

(52) U.S. Cl.
CPC ....... *H02M 1/0025* (2021.05); *H02M 1/0009* (2021.05); *H02M 1/0012* (2021.05); *H02M 1/4291* (2021.05)

(58) Field of Classification Search
CPC ............ H02M 1/0025; H02M 1/0009; H02M 1/4291; H02M 1/0012; H02M 3/1582; H02M 3/156; H02M 3/157; Y02B 70/10
See application file for complete search history.

(56) References Cited

U.S. PATENT DOCUMENTS

| 9,374,001 | B1 * | 6/2016 | Subramaniam | H02M 1/42 |
| 10,367,412 | B2 * | 7/2019 | Sugimoto | H02M 1/4225 |
| 2012/0281447 | A1 * | 11/2012 | Heo | H02M 3/1588 363/74 |
| 2013/0049620 | A1 * | 2/2013 | Komiya | H05B 45/375 323/311 |
| 2016/0181928 | A1 * | 6/2016 | Kok | H02M 3/33523 363/21.17 |
| 2017/0311400 | A1 * | 10/2017 | Newman, Jr. | H02M 1/10 |
| 2019/0364629 | A1 * | 11/2019 | Newman, Jr. | H02M 1/10 |
| 2020/0412237 | A1 * | 12/2020 | Dai | H02M 3/155 |
| 2022/0302846 | A1 * | 9/2022 | Liu | H02M 3/158 |

FOREIGN PATENT DOCUMENTS

| CN | 111432523 | A |   | 7/2020 |   |
| CN | 110769564 | B |   | 5/2021 |   |
| DE | 102014206021 | A1 | * | 10/2015 | ......... H05B 33/0815 |

* cited by examiner

*Primary Examiner* — Thienvu V Tran
*Assistant Examiner* — Yahveh Comas Torres
(74) *Attorney, Agent, or Firm* — CKC & Partners Co., LLC (57) ABSTRACT

The invention discloses a power conversion device and a voltage control method. The power conversion device includes a first stage circuit configured to generate a first output voltage, a second stage circuit configured to receive the first output voltage and generate an output current and a second output voltage, and a control unit configured to control the first stage circuit according to a set value of the output current, thereby adjusting the first output voltage. The invention can be adapted to a wide range load voltage by adjusting the first output voltage of the first stage circuit according to the set value of the output current of the second stage circuit.

18 Claims, 4 Drawing Sheets

POWER CONVERSION DEVICE AND VOLTAGE CONTROL METHOD

CROSS-REFERENCE TO RELATED APPLICATIONS

This non-provisional application claims priority under 35 U.S.C. § 119(a) on Patent Application 202111481016.5 filed in P.R. China on Dec. 6, 2021, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The application relates to the field of power technologies, and particularly to a power conversion device and a voltage control method.

2. Related Art

LED lighting has outstanding advantages such as energy saving and high luminous efficiency, so it is widely applied in various lighting applications.

Since high power LED switching power supplies are required to supply power for more and more kinds of lamps, it is often demanded for the power supplies to have the ability of outputting the maximum power within a wide range of output voltage. For example, a 600 W power supply can output a maximum power of 600 W within a range of output voltage from 200V to 600V, so a range of output constant current shall be set between 3 A and 1 A accordingly.

For the power supply at such power level, a two-stage architecture is often used. Currently, the mainstream scheme adopts an architecture of a first stage power factor correction (PFC) circuit which is mainly for constant voltage, and a second stage Buck circuit which is mainly for DC-DC step-down constant current.

However, in actual application, such scheme has the following technical deficiency. Efficiency of the second stage Buck circuit depends on the voltage difference between the input voltage and the output voltage, and generally, the larger the voltage difference is, the lower the efficiency will be. It is found that with a wide output voltage range for the Buck circuit, when an output voltage of the first stage PFC circuit is fixed, i.e., the input voltage of the Buck circuit is fixed, a lower output voltage of the Buck circuit will result in a larger output current of the Buck circuit. In this situation, since the duty cycle of the Buck circuit is small, the efficiency is low. Loss of switches is often dramatically increased, and thermal dissipation is severe, so more thermal dissipation measures are desired.

Generally, the input voltage of a power supply cannot be self-adapted to a wide voltage range of LED load (e.g., when a constant voltage input is 700V). When the voltage for the LED load is in a relatively narrow range (e.g., 400V to 600V), and the second stage Buck circuit works in a constant current mode at full power, then thermal dissipation could be acceptable. However, when the voltage for the LED load is in a wider range (e.g., 200V to 600V), and the voltage for the LED load is from 200V to 400V, and the Buck circuit works in a constant current mode at full power, thermal dissipation could be unacceptable. Therefore, in order to satisfy different customer requirements, power supply manufacturers either have to design power supplies for various specifications, or design a power supply adaptive to a wide voltage range of LED load. Otherwise, the power loss of switches would be considerably increased, and accordingly cost of the power supplies is increased with higher thermal dissipation cost.

SUMMARY OF THE INVENTION

An object of the invention is to provide a power conversion device and a voltage control method, which can overcome one or more deficiencies of the prior art.

In order to realize the above object, the invention provides a power conversion device, including: a first stage circuit configured to generate a first output voltage; a second stage circuit configured to receive the first output voltage and generate an output current and a second output voltage; and a control unit configured to control the first stage circuit according to a set value of the output current, thereby adjusting the first output voltage.

In one embodiment of the invention, when the set value of the output current is in different ranges, the first output voltage is adjusted to different voltages.

In one embodiment of the invention, when the set value of the output current is less than a first threshold, the first output voltage is adjusted to a first voltage; and when the set value of the output current is greater than or equal to the first threshold, the first output voltage is adjusted to a second voltage, which is less than the first voltage.

In one embodiment of the invention, the power conversion device further includes: a setting unit configured for a user to set the set value of the output current and transmit the set value of the output current to the control unit.

In one embodiment of the invention, the setting unit is a human-computer interaction interface, and communicates with the control unit via serial ports.

In one embodiment of the invention, the control unit includes: a processing unit for receiving the set value of the output current and outputting a first processing signal and a second processing signal; a first stage circuit control unit for receiving the first processing signal and outputting a first control signal to control the first stage circuit; and a second stage circuit control unit for receiving the second processing signal and outputting a second control signal to control the second stage circuit.

In one embodiment of the invention, the first stage circuit control unit includes: a first output voltage sampling circuit configured to sample the first output voltage and generate a first output voltage sampling signal; and a first controller configured to receive the first output voltage sampling signal and generate the first control signal to control the first stage circuit, wherein the first processing signal is configured to adjust a sampling ratio of the first output voltage sampling circuit, thereby adjusting the first output voltage.

In one embodiment of the invention, the second stage circuit control unit is a digital control unit.

In one embodiment of the invention, the second stage circuit control unit is an analog integrated circuit unit, including: an output current sampling circuit configured to sample the output current and generate an output current sampling signal; a reference voltage generating circuit configured to receive the second processing signal and generate a reference signal; an operational amplifier configured to generate a feedback signal according to the output current sampling signal and the reference signal; and a second controller configured to receive the feedback signal and generate the second control signal to control the second stage circuit.

In one embodiment of the invention, the first stage circuit receives an input voltage, and the control unit is further configured to further control the first stage circuit according to the input voltage, thereby adjusting the first output voltage.

In one embodiment of the invention, when the input voltage is less than a second threshold, and the set value of the output current is less than a first threshold, the control unit is configured to adjust the first output voltage to a first voltage; when the input voltage is less than the second threshold, and the set value of the output current is greater than or equal to the first threshold, the control unit is configured to adjust the first output voltage to a second voltage; and when the input voltage is greater than or equal to the second threshold, the control unit is configured to adjust the first output voltage to the first voltage.

In order to realize the above object, the invention further provides a voltage control method applied to a power conversion device, the power conversion device including a first stage circuit, a second stage circuit and a control unit, wherein the voltage control method includes: configuring the first stage circuit to generate a first output voltage; configuring the second stage circuit to receive the first output voltage and generate an output current and a second output voltage; and configuring the control unit to control the first stage circuit according to a set value of the output current, thereby adjusting the first output voltage.

In another embodiment of the invention, when the set value of the output current is in different ranges, the first output voltage is adjusted to different voltages.

In another embodiment of the invention, when the set value of the output current is less than a first threshold, the control unit is configured to adjust the first output voltage to a first voltage; and when the set value of the output current is greater than or equal to the first threshold, the control unit is configured to adjust the first output voltage to a second voltage, which is less than the first voltage.

In another embodiment of the invention, the voltage control method further includes: configuring a setting unit for a user to set the set value of the output current and transmit the set value of the output current to the control unit.

In another embodiment of the invention, the setting unit is a human-computer interaction interface, and communicates with the control unit via serial ports.

In another embodiment of the invention, the voltage control method further includes: configuring a processing unit to receive the set value of the output current and output a first processing signal and a second processing signal; configuring a first stage circuit control unit to receive the first processing signal and output a first control signal to control the first stage circuit; and configuring a second stage circuit control unit to receive the second processing signal and output a second control signal to control the second stage circuit.

In another embodiment of the invention, configuring the first stage circuit control unit to receive the first processing signal and output the first control signal to control the first stage circuit includes: configuring a first output voltage sampling circuit to sample the first output voltage and generate a first output voltage sampling signal; and configuring a first control circuit to receive the first output voltage sampling signal and generate the first control signal to control the first stage circuit, wherein the first processing signal is configured to adjust a sampling ratio of the first output voltage sampling circuit, thereby adjusting the first output voltage.

In another embodiment of the invention, the second stage circuit control unit is a digital control unit.

In another embodiment of the invention, the second stage circuit control unit is an analog integrated circuit unit, and configuring the second stage circuit control unit to receive the second processing signal and output the second control signal to control the second stage circuit includes: configuring an output current sampling circuit to sample the output current and generate an output current sampling signal; configuring a reference voltage generating circuit to receive the second processing signal and generate a reference signal; configuring an operational amplifier to generate a feedback signal according to the output current sampling signal and the reference signal; and configuring a second controller to receive the feedback signal and generate the second control signal to control the second stage circuit.

In another embodiment of the invention, the voltage control method further includes: configuring the control unit to further control the first stage circuit according to an input voltage of the first stage circuit, thereby adjusting the first output voltage.

In another embodiment of the invention, when the input voltage is less than a second threshold, and the set value of the output current is less than a first threshold, the control unit is configured to adjust the first output voltage to a first voltage; when the input voltage is less than the second threshold, and the set value of the output current is greater than or equal to the first threshold, the control unit is configured to adjust the first output voltage to a second voltage; and when the input voltage is greater than or equal to the second threshold, the control unit is configured to adjust the first output voltage to the first voltage.

BRIEF DESCRIPTION OF THE DRAWINGS

The exemplary embodiments are described in details with reference to the accompanying drawings, through which the above and other features and advantages of the invention will become more apparent.

DETAILED EMBODIMENTS OF THE INVENTION

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

Figure 1:
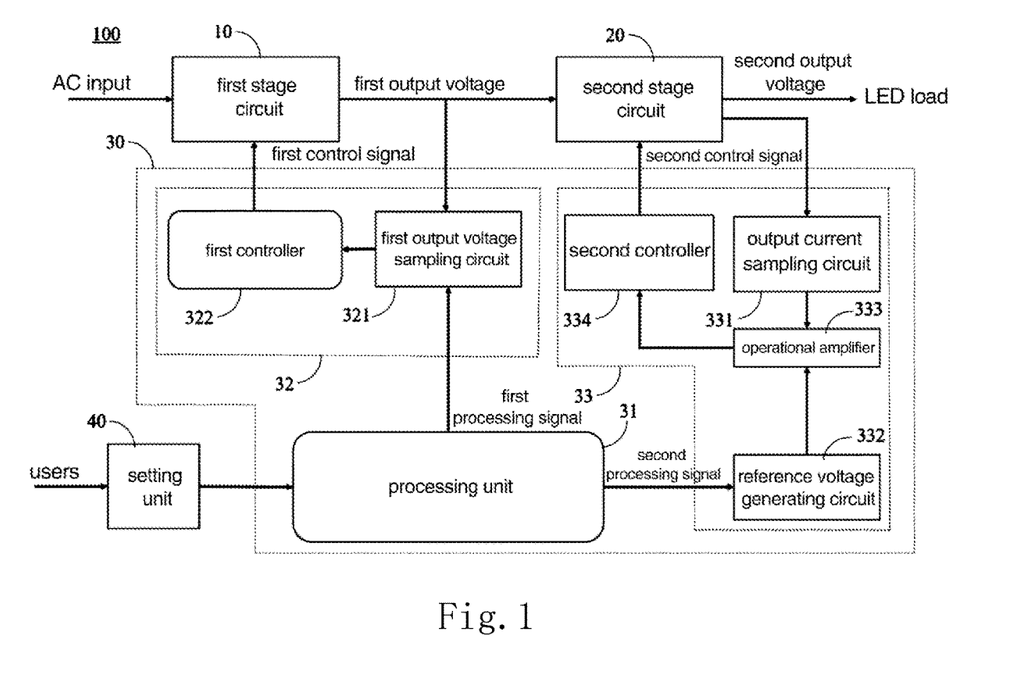
FIG. 1 is a block diagram of a circuit of a power conversion device according to the invention.

As shown in FIG. 1, a power conversion device 100 of the invention includes a first stage circuit 10 configured to generate a first output voltage, a second stage circuit 20 configured to receive the first output voltage and generate an output current and a second output voltage, and a control unit 30 configured to control the first stage circuit 10 according to a set value of the output current, thereby adjusting the first output voltage. Adjustment may be made following a set rule. For example, when the set value of the output current is in different ranges, the first output voltage may be adjusted to be different. More specifically, when the set value of the output current is less than a first threshold, the first output voltage, for example, may be adjusted to a first voltage, and when the set value of the output current is greater than or equal to the first threshold, the first output voltage, for example, may be adjusted to a second voltage, which is less than the first voltage.

In some embodiments of the invention, the control unit 30, for example, may include a processing unit 31 for receiving the set value of the output current and outputting a first processing signal and a second processing signal, a first stage circuit control unit 32 for receiving the first processing signal and outputting a first control signal to control the first stage circuit 10, and a second stage circuit control unit 33 for receiving the second processing signal and outputting a second control signal to control the second stage circuit 20.

Specifically, the first stage circuit control unit 32 may include a first output voltage sampling circuit 321 configured to sample the first output voltage and generate a first output voltage sampling signal, and a first controller 322 configured to receive the first output voltage sampling signal and generate the first control signal to control the first stage circuit 10. The first processing signal may be configured to adjust a sampling ratio of the first output voltage sampling circuit 321.

Specifically, the second stage circuit control unit 33 may be an analog integrated circuit unit including an output current sampling circuit 331 configured to sample the output current and generate an output current sampling signal, a reference voltage generating circuit 332 configured to receive the second processing signal and generate a reference signal, an operational amplifier 333 configured to generate a feedback signal according to the output current sampling signal and the reference signal, and a second controller 334 configured to receive the feedback signal and generate the second control signal to control the second stage circuit 20. It can be understood that in other embodiments, the second stage circuit control unit 33 also may be a digital control unit, but the invention is not limited thereto.

In some embodiments of the invention, the power conversion device 100 may further include a setting unit 40 configured for a user to set the set value of the output current and transmit the set value of the output current to the control unit 30. The setting unit 40 may communicate with the control unit 30 via serial ports.

In the embodiment of FIG. 1, preferably, the first stage circuit 10, for example, may be a PFC circuit, the second stage circuit 20, for example, may be a Buck circuit, the processing unit 31, for example, may be a microprocessor (MCU), and the setting unit 40, for example, may be a human-computer interaction interface, but the invention is not limited thereto.

When an AC input is received by the PFC circuit, the first output voltage is generated, and the first output voltage is supplied to the Buck circuit as an input voltage, and the second output voltage is generated to a LED load.

The first output voltage is fed back to the first controller 322 through the first output voltage sampling circuit 321, and is applied to control the first output voltage. The first output voltage sampling circuit 321 may receive a first processing signal of the processing unit 31 (e.g., the microprocessor) to generate different sampling ratios, thereby generating different output voltage sampling signals. The first controller 322 generates different first control signals to control the first output voltage to be different according to different output voltage sampling signals.

An output current of the Buck circuit may be sampled by the output current sampling circuit 331 to generate an output current sampling signal. The reference voltage generating circuit 332 may receive the second processing signal (e.g., which may be a signal with different duty cycles) of the processing unit 31 (e.g., the microprocessor) to generate a reference signal. The output current sampling signal and the reference signal are operated by the operational amplifier 333 to generate a feedback signal. The feedback signal is fed to the second controller 334, thereby generating a second control signal to control the output current of the Buck circuit to be constant to supply to the LED load.

The user may set a set value of the output current of the Buck circuit through the human-computer interaction interface, and transmit the set value of the output current to the microprocessor, such that the microprocessor can generate the first processing signal and the second processing signal according to the set rule, so as to control the reference voltage generating circuit 332 and the first output voltage sampling circuit 321 respectively.

In some embodiments of the invention, the first stage circuit 10 may receive an input voltage (e.g., an AC input, but the invention is not limited thereto). The control unit 30 may be further configured to control the first stage circuit 10 according to the input voltage of the first stage circuit 10, thereby adjusting the first output voltage. In other words, the control unit 30 may further adjust the first output voltage according to the input voltage of the first stage circuit 10 and the set value of the output current of the second stage circuit. More specifically, when the input voltage of the first stage circuit 10 is less than a second threshold, and the set value of the output current of the second stage circuit 20 is less than a first threshold, the control unit 30 may be configured to adjust the first output voltage to a first voltage. When the input voltage of the first stage circuit 10 is less than the second threshold, and the set value of the output current of the second stage circuit 20 is greater than or equal to the first threshold, the control unit 30 may be configured to adjust the first output voltage to a second voltage. When the input voltage of the first stage circuit 10 is greater than or equal to the second threshold, the control unit 30 may be configured to adjust the first output voltage to the first voltage.

Figure 2:
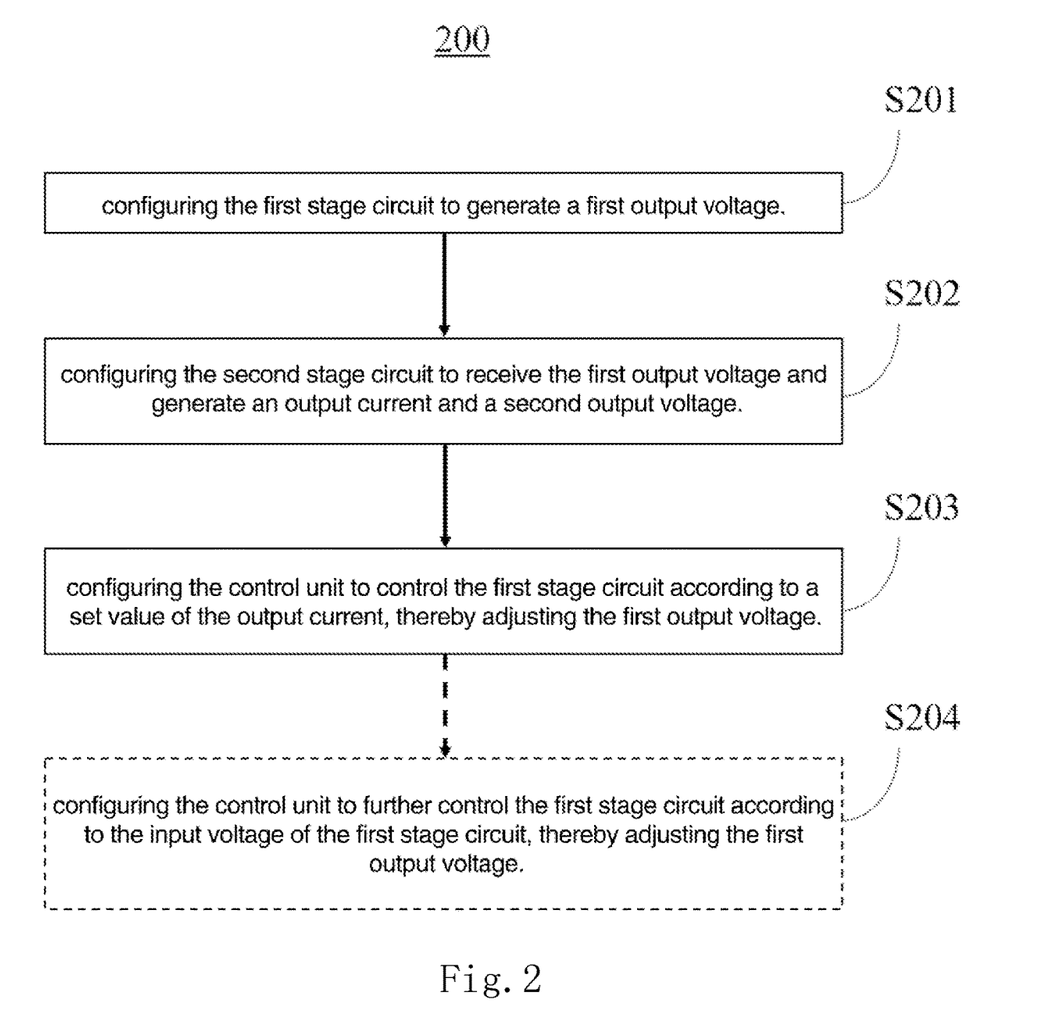
FIG. 2 is a flow diagram of a voltage control method of the power conversion device according to the invention.

As shown in FIG. 2, the invention provides a voltage control method 200 correspondingly applied to the power conversion device 100 in FIG. 1. The voltage control method 200 may include step S201, configuring the first stage circuit to generate a first output voltage; step S202, configuring the second stage circuit to receive the first output voltage and generate an output current and a second output voltage; and step S203, configuring the control unit to control the first stage circuit according to a set value of the output current, thereby adjusting the first output voltage.

In some embodiments of the invention, the voltage control method 200 may further include step S204, configuring the control unit to further control the first stage circuit according to an input voltage of the first stage circuit, thereby adjusting the first output voltage.

In some embodiments of the invention, the voltage control method 200 may further include configuring a setting unit for a user to set the set value of the output current and transmit the set value of the output current to the control unit.

Hereinafter the power conversion device and the voltage control method in the invention are described in detail with reference to FIGS. 3 to 5.

Figure 3:
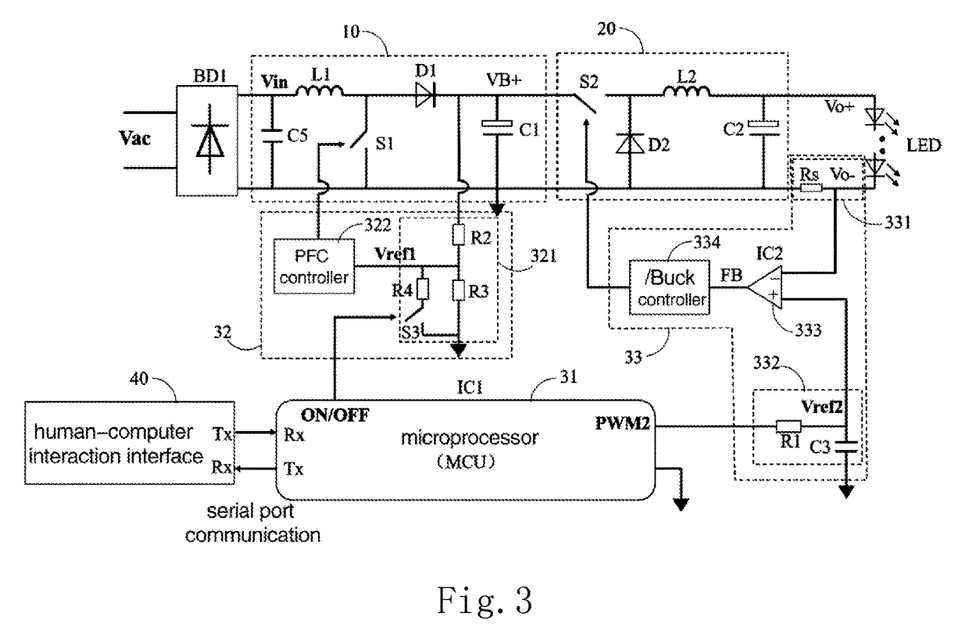
FIG. 3 is a circuit diagram of a power conversion device in a first preferable embodiment of the invention.

As shown in FIG. 3, it illustrates a circuit of the power conversion device in a first preferable embodiment of the invention, wherein Vac is an input AC voltage, BD1 is a rectifying circuit, which may convert the input AC voltage Vac into an input voltage Vin. Moreover, a capacitor C5, an inductor L1, a switch S1, a diode D1 and a capacitor C1 form a Boost circuit (i.e., the first stage circuit 10), which may boost the input voltage Vin to a voltage VB+ (i.e., the first output voltage). A PFC controller (i.e., the first controller 322) may control the switch S1 to be turned on and off, thereby adjusting the voltage VB+ to a DC stabilized voltage. A resistor R2, a resistor R3, a resistor R4 and a switch S3 form a PFC output voltage sampling circuit (i.e., the first output voltage sampling circuit 321), which may generate a dividing voltage Vref1 (i.e., the first output voltage sampling signal). When the switch S3 is turned off, the resistor R4 and the resistor R3 are connected in parallel to form a branch. The branch is connected in series with the resistor R2 to obtain a first voltage-dividing ratio, such that the voltage VB+ may be controlled to a voltage V1. When the switch S3 is turned on, the resistor R3 and the resistor R2 are connected in series to obtain a second voltage-dividing ratio, such that the voltage VB+ may be controlled to a voltage V2, which is less than the voltage V1. Whether the desired voltage VB+ is V1 or V2 may be controlled by a processing unit 31.

In this embodiment, the processing unit 31 may be a microprocessor (MCU), such as, an integrated circuit unit IC1, and exchanges information with the setting unit (e.g., the human-computer interaction interface) 40 via serial port communication, for example, receiving instruction information from the human-computer interaction interface.

In this embodiment, a switch S2, an inductor L2, a diode D2 and a capacitor C2 form a Buck circuit (i.e., the second stage circuit 20), which may convert the voltage VB+ into a voltage $V_O$. The voltage $V_O$ may be outputted to a load (e.g., the LED). An output current Io flowing through the LED flows through a sampling resistor Rs, and an output current sampling signal (Io*Rs) connected to a negative terminal of the operational amplifier 333 is generated. The operational amplifier 333, for example, is an integrated circuit unit IC2.

A port PWM2 of the processing unit 31 generates a duty cycle adjustable processing signal with a fixed frequency Fs, and a fixed amplitude VDD. And after being filtered by the resistor R1 and the capacitor C3, this processing signal is converted into a signal Vref2 which is connected to a positive terminal of the operational amplifier 333 as a reference signal. The operational amplifier 333 provides a feedback signal FB to the Buck controller (i.e., the second controller 334) according to a difference between the two signals (i.e., the output current sampling signal and the reference signal), thereby controlling the switch S2, and allowing a current flowing through the LED to be constant.

In this embodiment, the duty cycle adjustable processing signal from the port PWM2 is generated after the microprocessor receives a signal from the human-computer interaction interface, and the duty cycle may be any value from 0% to 100%.

Figure 4:
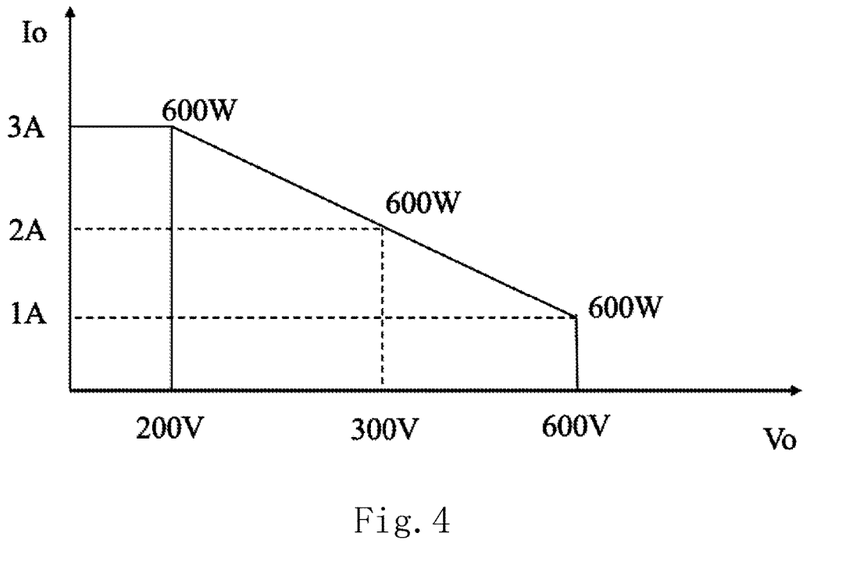
FIG. 4 is a schematic diagram of output characteristic of a 600 W power conversion device.

Taking output characteristic of a 600 W power conversion device for example, as shown in FIG. 4, a range of the output voltage is between 200V and 600V, a range of the output current is between 1 A and 3 A, and a power of 600 W can be outputted. If the output current has been set to Io, the maximum output voltage Vomax equals to 600 W/Io, and the minimum output voltage is 0V. Since the output current Io of the power conversion device is controlled to be constant, and can be set by the user through the human-computer interaction interface, the output voltage of the corresponding power conversion device may be between 0V and 600 W/Io. For example, if the user sets the output current Io to be 1 A, a range of the output voltage is between 0V and 600V. If the user sets the output current Io to be 2 A, a range of the output voltage is between 0V and 300V. If the user sets the output current Io to be 3 A, a range of the output voltage is between 0V and 200V. If the user sets the output current Io to be greater than 3 A, the output current Io is limited to be 3 A, and the output voltage can only be defined between 0V and 200V.

Due to the requirement for voltage stepping down, the input voltage VB+ of the Buck circuit must be greater than or equal to the output voltage $V_O$. And since the maximum output voltage is 600V, in the case that the voltage VB+ is fixed to be 700V, the following table I shows duty cycle of the switch S2, which is working in a continuous conduction mode (CCM) or a critical conduction mode (CRM) at the maximum full-load power (Pomax) 600 W when the current is from 1 A to 3 A.

As can be known from table I, when the output voltage Vo is 200V, and the output current Io is 3 A, a duty cycle is only 28%. The smaller the duty cycle of the Buck circuit is, the lower the efficiency will be, and the larger the loss will be. Therefore, under such condition, thermal dissipation of the power conversion device is maximum, and the desired radiator is large.

TABLE I

Comparison of duty cycles corresponding to different output currents with maximum output power at 600 W

| Pomax | Vo | Io | VB+ | Duty cycle |
|---|---|---|---|---|
| 600 W | 600 V | 1 A | 700 V | 85% |
| 600 W | 400 V | 1.5 A | 700 V | 57% |

TABLE I-continued

Comparison of duty cycles corresponding to different output currents with maximum output power at 600 W

| Pomax | Vo | Io | VB+ | Duty cycle |
|---|---|---|---|---|
| 600 W | 300 V | 2 A | 700 V | 43% |
| 600 W | 200 V | 3 A | 700 V | 28% |

According to the first preferable embodiment of the invention, the signal from a port ON/OFF of the microprocessor (MCU) adjusts a sampling ratio of the first output voltage sampling circuit, and adjusts the output voltage VB+ of the first stage circuit 10 as follows. As shown in the following table II, the output voltage VB+ is reduced from 700V to 500V, and the duty cycle is increased from 28% to 40% under condition of 200V/3 A. The output voltage VB+ is reduced from 700V to 500V, and the duty cycle is increased from 43% to 60% under condition of 300V/2 A. The output voltage VB+ is reduced from 700V to 500V, and the duty cycle is increased from 57% to 80% under condition of 400V/1.5 A. Increasing duty cycle is benefit for improving efficiency, and decreasing loss, thereby reducing a size of cooling fins.

TABLE II

Comparison of duty cycles corresponding to different currents with maximum output power at 600 W after VB+ is changed

| Pomax | Vo | Io | VB+ | Duty cycle |
|---|---|---|---|---|
| 600 W | 600 V | 1 A | 700 V | 85% |
| 600 W | 400 V | 1.5 A | 500 V | 80% |
| 600 W | 300 V | 2 A | 500 V | 60% |
| 600 W | 200 V | 3 A | 500 V | 40% |

Signals from the two control ports ON/OFF and PWM2 of the microprocessor (MCU) are correspondingly in the following Table III.

TABLE III

State of signal of ON/OFF and duty cycle of signal of PWM2 of the microprocessor corresponding to different currents with maximum output power at 600 W

| Pomax | Vo | Io | VB+ | Duty cycle | ON/OFF | Duty cycle of PWM2 |
|---|---|---|---|---|---|---|
| 600 W | 600 V | 1A | 700 V | 85% | ON | 33% |
| 600 W | 400 V | 1.5A | 500 V | 80% | OFF | 50% |
| 600 W | 300 V | 2A | 500 V | 60% | OFF | 66% |
| 600 W | 200 V | 3A | 500 V | 40% | OFF | 100% |

The output current Io is not limited to be set to 1 A, 1.5 A, 2 A and 3 A in table III. It can be set to any value within 1 A to 3 A. When the output current Io is set to be less than 1.5 A, the output voltage VB+ can be controlled to be 700V, and when the output current Io is set to be greater than or equal to 1.5 A, the output voltage VB+ is controlled to be 500V. That is, when the output current Io is set to be less than a first threshold (e.g., 1.5 A), the control unit may be configured to adjust the first output voltage to a first voltage (e.g., 700V), and when the output current Io is set to be greater than or equal to the first threshold (e.g., 1.5 A), the control unit is configured to adjust the first output voltage to a second voltage (e.g., 500V).

Figure 5:
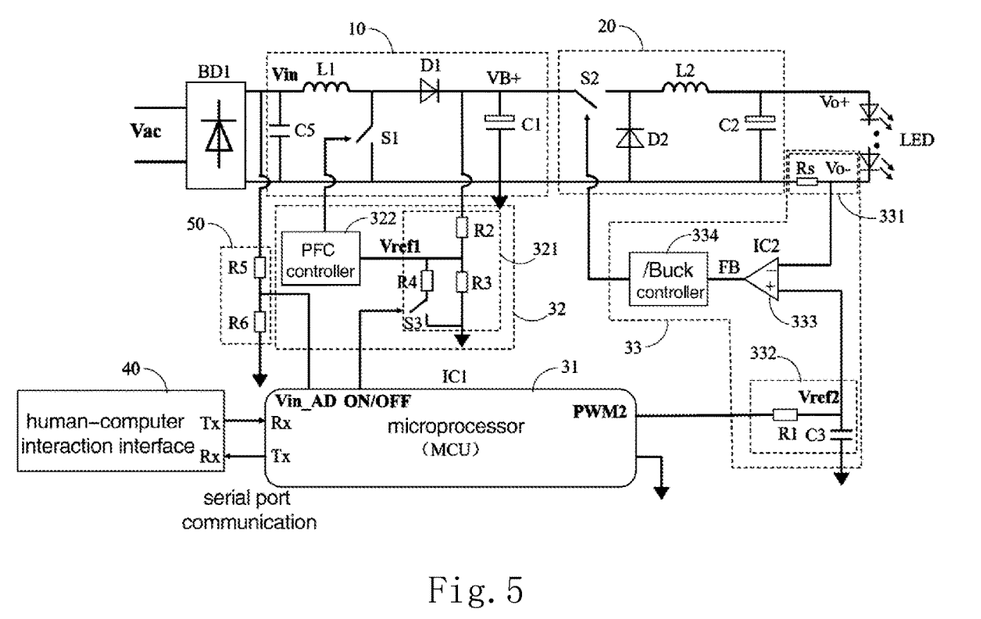
FIG. 5 is a circuit diagram of a power conversion device in a second preferable embodiment of the invention.

As shown in FIG. 5, it illustrates a circuit of the power conversion device in a second preferable embodiment of the invention. What is different from the first preferable embodiment of FIG. 3 is that after the resistors R5 and R6 divide the input voltage Vin, an input voltage sampling signal Vin_AD connected to the microprocessor (MCU) is generated, i.e., a signal for the integrated circuit unit IC1 to detect the input voltage.

As shown in FIG. 4, it illustrates output characteristic of a 600 W power conversion device. Moreover, as shown in table I, it shows duty cycle of the switch S2, which is working in a continuous conduction mode (CCM) or a critical conduction mode (CRM) with the maximum full-load power (Pomax) at 600 W when the current is from 1 A to 3 A. As can be known from table I, when the output voltage Vo is 200V, and the output voltage Io is 3 A, a duty cycle is only 28%. The smaller the duty cycle of the Buck circuit is, the lower the efficiency will be, and the larger the loss will be. Therefore, under such condition, thermal dissipation of the power conversion device is maximum, and the desired radiator is large.

According to the second preferable embodiment of the invention, the signal of the port ON/OFF controlled by the microprocessor (MCU) adjusts a sampling ratio of the first output voltage sampling circuit, and adjusts the output voltage VB+ of the first stage circuit 10 as follows. After the resistors R5 and R6 divide the input voltage Vin, an input voltage sampling signal Vin_AD is obtained, and then a value of the input voltage Vin is obtained through operation of the microprocessor (MCU). The input voltage Vin may be classified into two levels, which are Vin<340 Vrms and Vin>=340 Vrms. Since the first stage circuit 10 is a step-up circuit, the output voltage VB+ must be greater than or equal to a peak voltage of the input voltage Vin. And a peak voltage of the input voltage Vin=340 Vrms is 340*1.4142=480V, which is less than the lowest output voltage that is set (i.e., 500V), so the first stage circuit 10 can work normally.

In this second preferable embodiment, as shown in the following table IV, the output voltage VB+ is further set according to the input voltage Vin. When Vin<340 Vrms, the output voltage VB+ is decreased from 700V to 500V, and the duty cycle is increased from 28% to 40% under condition of 200V/3 A; the output voltage VB+ is decreased from 700V to 500V, and the duty cycle is increased from 43% to 60% under condition of 300V/2 A; the output voltage VB+ is decreased from 700V to 500V, and the duty cycle is increased from 57% to 80% under condition of 400V/1.5 A. Increasing duty cycle is benefit for improving efficiency, and decreasing loss. When the output voltage VB+ is decreased from 700V to 500V, a difference between input and output voltages of the first stage circuit 10 also can be reduced, which can further improve efficiency.

When Vin>=340 Vrms, since the lowest output voltage of the first stage circuit 10 is 500V, the output voltage VB+ shall be held to be 700V, such that normal working of the first stage circuit 10 can be ensured. Since the input voltage Vin is high, the difference between the output and input voltages of the first stage circuit 10 is small, and efficiency is high, so it is helpful to set the output voltage VB+ to 700V.

TABLE IV

Comparison of duty cycles corresponding to different currents with maximum output power at 600 W after VB+ is changed

| Pomax | Vo | Vin | Io | VB+ | Duty cycle |
|---|---|---|---|---|---|
| 600 W | 600 V | <340 Vrms | 1 A | 700 V | 85% |
| 600 W | 400 V |  | 1.5 A | 500 V | 80% |
| 600 W | 300 V |  | 2 A | 500 V | 60% |
| 600 W | 200 V |  | 3 A | 500 V | 40% |
| 600 W | 600 V | ≥340 Vrms | 1 A | 700 V | 85% |
| 600 W | 400 V |  | 1.5 A | 700 V | 57% |
| 600 W | 300 V |  | 2 A | 700 V | 43% |
| 600 W | 200 V |  | 3 A | 700 V | 28% |

Signals from the two control ports ON/OFF and PWM2 of the microprocessor (MCU) are correspondingly shown in the following table V.

TABLE V

Comparison of duty cycles corresponding to different currents with maximum output power at 600 W after VB+ is changed

| Pomax | Vo | Vin | Io | VB+ | Duty cycle | ON/OFF | Duty cycle of PWM2 |
|---|---|---|---|---|---|---|---|
| 600 W | 600 V | <340 Vrms | 1A | 700 V | 85% | ON | 33% |
| 600 W | 400 V |  | 1.5A | 500 V | 80% | OFF | 50% |
| 600 W | 300 V |  | 2A | 500 V | 60% | OFF | 66% |
| 600 W | 200 V |  | 3A | 500 V | 40% | OFF | 100% |
| 600 W | 600 V | >340 Vrms | 1A | 700 V | 85% | ON | 33% |
| 600 W | 400 V |  | 1.5A | 700 V | 57% | ON | 50% |
| 600 W | 300 V |  | 2A | 700 V | 43% | ON | 66% |
| 600 W | 200 V |  | 3A | 700 V | 28% | ON | 100% |

The output current Io is not limited to be set to 1 A, 1.5 A, 2 A and 3 A in table V. It can be any value within 1 A to 3 A. The output voltage VB+ may be decided by the input voltage Vin and the set value of the output current Io, which is shown as follows.

(1) when Vin<340 Vrms, and the output current Io is set to be less than 1.5 A, the output voltage VB+ is controlled to be 700V;

(2) when Vin<340 Vrms, and the output current Io is set to be greater than or equal to 1.5 A, the output voltage VB+ is controlled to be 500V;

(3) when Vin>=340 Vrms, and the output current Io is set to be less than 1.5 A, the output voltage VB+ is controlled to be 700V;

(4) when Vin>=340 Vrms, and the output current Io is set to be greater than or equal to 1.5 A, the output voltage VB+ is controlled to be 700V.

The protection scope of the invention is not limited to the above mentioned embodiments. For example, the first stage circuit of the invention is not limited to a Boost PFC circuit, and can also be a Flyback PFC circuit or other DC/DC circuits. Moreover, in some other embodiments of the invention, the output voltage of the first stage circuit is not limited to be only adjusted to two levels, but can also to three levels, or be adjusted steplessly. The output current of the second stage circuit is not limited to be only set to two levels, but can also be set steplessly.

The invention can be adapted to a wide range voltage for the load by adjusting the output voltage of the first stage circuit according to the set value of the output current of the second stage circuit.

Exemplary embodiments of the application are illustrated and described in details. It shall be understood that the application is not limited to the disclosed embodiments, and in contrast, the application aims to cover various modifications and equivalent arrangements included in spirit and scope of the appended claims.

What is claimed is:

1. A power conversion device, comprising:
a first stage circuit configured to generate a first output voltage;
a second stage circuit configured to receive the first output voltage and generate an output current and a second output voltage; and
a control unit configured to control the first stage circuit according to a set value of the output current, thereby adjusting the first output voltage,
wherein the first stage circuit receives an input voltage, and the control unit is configured to further control the first stage circuit according to the input voltage, thereby adjusting the first output voltage,
when the input voltage is less than a second threshold, and the set value of the output current is less than a first threshold, the control unit is configured to adjust the first output voltage to a first voltage;
when the input voltage is less than the second threshold, and the set value of the output current is greater than or equal to the first threshold, the control unit is configured to adjust the first output voltage to a second voltage; and
when the input voltage is greater than or equal to the second threshold, the control unit is configured to adjust the first output voltage to the first voltage.

2. The power conversion device according to claim 1, wherein when the set value of the output current is in different ranges, the first output voltage is adjusted to different voltages.

3. The power conversion device according to claim 2, wherein,
when the set value of the output current is less than a first threshold, the first output voltage is adjusted to a first voltage; and
when the set value of the output current is greater than or equal to the first threshold, the first output voltage is adjusted to a second voltage, which is less than the first voltage.

4. The power conversion device according to claim 1, further comprising:
a setting unit configured for a user to set the set value of the output current and transmit the set value of the output current to the control unit.

5. The power conversion device according to claim 4, wherein the setting unit is a human-computer interaction interface, and communicates with the control unit via serial ports.

6. The power conversion device according to claim 1, wherein the control unit comprises:
a processing unit for receiving the set value of the output current and outputting a first processing signal and a second processing signal;
a first stage circuit control unit for receiving the first processing signal and outputting a first control signal to control the first stage circuit; and
a second stage circuit control unit for receiving the second processing signal and outputting a second control signal to control the second stage circuit.

7. The power conversion device according to claim 6, wherein the first stage circuit control unit comprises:
a first output voltage sampling circuit configured to sample the first output voltage and generate a first output voltage sampling signal; and a first controller configured to receive the first output voltage sampling signal and generate the first control signal to control the first stage circuit, wherein the first processing signal is configured to adjust a sampling ratio of the first output voltage sampling circuit, thereby adjusting the first output voltage.

8. The power conversion device according to claim 6, wherein the second stage circuit control unit is a digital control unit.

9. The power conversion device according to claim 6, wherein the second stage circuit control unit is an analog integrated circuit unit, comprising:

an output current sampling circuit configured to sample the output current and generate an output current sampling signal;

a reference voltage generating circuit configured to receive the second processing signal and generate a reference signal;

an operational amplifier configured to generate a feedback signal according to the output current sampling signal and the reference signal; and a second controller configured to receive the feedback signal and generate the second control signal to control the second stage circuit.

10. A voltage control method applied to a power conversion device, the power conversion device comprising a first stage circuit, a second stage circuit and a control unit, wherein the voltage control method comprises:

configuring the first stage circuit to generate a first output voltage;

configuring the second stage circuit to receive the first output voltage and generate an output current and a second output voltage; and configuring the control unit to control the first stage circuit according to a set value of the output current, thereby adjusting the first output voltage, configuring the control unit to further control the first stage circuit according to an input voltage of the first stage circuit, thereby adjusting the first output voltage, when the input voltage is less than a second threshold, and the set value of the output current is less than a first threshold, the control unit is configured to adjust the first output voltage to a first voltage;

when the input voltage is less than the second threshold, and the set value of the output current is greater than or equal to the first threshold, the control unit is configured to adjust the first output voltage to a second voltage; and when the input voltage is greater than or equal to the second threshold, the control unit is configured to adjust the first output voltage to the first voltage.

11. The voltage control method according to claim 10, wherein when the set value of the output current is in different ranges, the first output voltage is adjusted to different voltages.

12. The voltage control method according to claim 11, wherein, when the set value of the output current is less than a first threshold, the control unit is configured to adjust the first output voltage to a first voltage; and when the set value of the output current is greater than or equal to the first threshold, the control unit is configured to adjust the first output voltage to a second voltage, which is less than the first voltage.

13. The voltage control method according to claim 10, further comprising:

configuring a setting unit for a user to set the set value of the output current and transmit the set value of the output current to the control unit.

14. The voltage control method according to claim 13, wherein the setting unit is a human-computer interaction interface, and communicates with the control unit via serial ports.

15. The voltage control method according to claim 10, further comprising:

configuring a processing unit to receive the set value of the output current and output a first processing signal and a second processing signal;

configuring a first stage circuit control unit to receive the first processing signal and output a first control signal to control the first stage circuit; and configuring a second stage circuit control unit to receive the second processing signal and output a second control signal to control the second stage circuit.

16. The voltage control method according to claim 15, wherein configuring the first stage circuit control unit to receive the first processing signal and output the first control signal to control the first stage circuit comprises:

configuring a first output voltage sampling circuit to sample the first output voltage and generate a first output voltage sampling signal; and configuring a first control circuit to receive the first output voltage sampling signal and generate the first control signal to control the first stage circuit, wherein the first processing signal is configured to adjust a sampling ratio of the first output voltage sampling circuit, thereby adjusting the first output voltage.

17. The voltage control method according to claim 15, wherein the second stage circuit control unit is a digital control unit.

18. The voltage control method according to claim 15, wherein the second stage circuit control unit is an analog integrated circuit unit, and configuring the second stage circuit control unit to receive the second processing signal and output the second control signal to control the second stage circuit comprises:

configuring an output current sampling circuit to sample the output current and generate an output current sampling signal;

configuring a reference voltage generating circuit to receive the second processing signal and generate a reference signal;

configuring an operational amplifier to generate a feedback signal according to the output current sampling signal and the reference signal; and configuring a second controller to receive the feedback signal and generate the second control signal to control the second stage circuit.

\* \* \* \* \*